(12) United States Patent
Jeong et al.

(10) Patent No.: US 12,122,117 B2
(45) Date of Patent: Oct. 22, 2024

(54) COMPRESSION TYPE DEHYDRATOR

(71) Applicant: LG CHEM, LTD., Seoul (KR)

(72) Inventors: In Yong Jeong, Daejeon (KR); Sung Woo Jeong, Daejeon (KR); Eun Jung Joo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 374 days.

(21) Appl. No.: 17/628,020

(22) PCT Filed: Jul. 9, 2021

(86) PCT No.: PCT/KR2021/008783
§ 371 (c)(1),
(2) Date: Jan. 18, 2022

(87) PCT Pub. No.: WO2022/065644
PCT Pub. Date: Mar. 31, 2022

(65) Prior Publication Data
US 2022/0402229 A1 Dec. 22, 2022

(30) Foreign Application Priority Data
Sep. 25, 2020 (KR) .................... 10-2020-0124724

(51) Int. Cl.
*B30B 9/06* (2006.01)
*B30B 7/02* (2006.01)
(Continued)

(52) U.S. Cl.
CPC .............. *B30B 9/06* (2013.01); *B30B 7/02* (2013.01); *B30B 9/26* (2013.01); *C08F 6/008* (2013.01); *C08F 6/22* (2013.01); *C08F 293/00* (2013.01)

(58) Field of Classification Search
CPC .. B30B 9/06; B30B 9/26; B30B 9/105; B30B 9/265; B30B 7/02; B30B 7/023;
(Continued)

(56) References Cited

U.S. PATENT DOCUMENTS

| 4,346,003 A | 8/1982 | Polyakov et al. |
| 4,906,369 A | 3/1990 | Bahr |

(Continued)

FOREIGN PATENT DOCUMENTS

| CN | 101745260 A | 6/2010 |
| CN | 104722107 A | 6/2015 |

(Continued)

OTHER PUBLICATIONS

Extended European Search Report dated Sep. 20, 2023, issued in corresponding European Patent Application No. 21835924.8.
(Continued)

*Primary Examiner* — Mohammed S. Alawadi
(74) *Attorney, Agent, or Firm* — Morgan, Lewis & Bockius LLP

(57) ABSTRACT

Disclosed is a compression type dehydrator including: an upper plate that includes a pressurizing portion and a first guide adjacent to the pressurizing portion and spaced apart from the pressurizing portion, and performs a vertical movement by a hydraulic cylinder; a feed plate that includes a hollow portion and a first guide groove surrounding the hollow portion and guiding the vertical movement of the first guide, and is positioned on a lower portion of the upper plate; a slurry supply line connected to the feed plate; a lower plate positioned on a lower portion of the feed plate and having a plurality of holes formed therein; and a dehydration means including a filtration belt positioned in close contact with an upper portion of the lower plate.

20 Claims, 11 Drawing Sheets

(51) Int. Cl.
*B30B 9/10* (2006.01)
*B30B 9/26* (2006.01)
*C08F 6/00* (2006.01)
*C08F 6/22* (2006.01)
*C08F 293/00* (2006.01)
*F26B 5/14* (2006.01)

(58) Field of Classification Search
CPC .... C08F 6/008; C08F 6/22; C08F 6/00; C08F 293/00; F26B 5/14
See application file for complete search history.

(56) References Cited

U.S. PATENT DOCUMENTS

| | | | | |
|---|---|---|---|---|
| 5,051,194 A | * | 9/1991 | Bahr | B01D 25/287 210/770 |
| 5,386,768 A | * | 2/1995 | Goetz | B01D 33/644 100/118 |
| 5,863,429 A | | 1/1999 | Bahr | |
| 2010/0065514 A1 | | 3/2010 | Bahr | |
| 2013/0001150 A1 | * | 1/2013 | Bahr | B01D 25/32 210/396 |

FOREIGN PATENT DOCUMENTS

| | | |
|---|---|---|
| CN | 104743695 A | 7/2015 |
| CN | 204522421 U | 8/2015 |
| CN | 107352775 A | 11/2017 |
| EP | 0 245 490 B1 | 7/1992 |
| JP | H07-24402 U | 5/1995 |
| JP | 2010-064071 A | 3/2010 |
| JP | 2014-050825 A | 3/2014 |
| KR | 10-0946262 B1 | 3/2010 |
| KR | 10-1245134 B1 | 4/2013 |
| KR | 10-1332031 B1 | 11/2013 |
| KR | 10-1345389 B1 | 12/2013 |
| KR | 10-2014-0005272 A | 1/2014 |
| KR | 10-2017-0047038 A | 5/2017 |

OTHER PUBLICATIONS

International Search Report and Written Opinion issued in corresponding International Patent Application No. PCT/KR2021/008783, dated Oct. 18, 2021.
Office Action issued on Mar. 27, 2024 in Chinese Patent Application No. 202180004704.4 Note: U.S. Pat. No. 5051194 cited therein is already of record.

* cited by examiner

COMPRESSION TYPE DEHYDRATOR

CROSS-REFERENCE TO RELATED APPLICATION(S)

The present application claims priority to Korean Patent Application No. 10-2020-0124724, filed Sep. 25, 2020, the entire contents of which is incorporated herein for all purposes by this reference.

TECHNICAL FIELD

The present invention relates to a compression type dehydrator, and more particularly, to a compression type dehydrator in which the dehydration performance of a polymer slurry is improved by increasing a pressure for pressurizing the polymer slurry.

BACKGROUND ART

In general, the process of producing polymers largely includes polymerization, coagulation, dehydration, and drying processes, and the polymer slurry produced through the polymerization and coagulation processes contains a large amount of water or moisture.

The drying process is performed in a manner through heating using a hot air dryer, a fluidized bed dryer, an airflow dryer, an infrared dryer, a dielectric heating dryer, or the like, and in this case, in order to reduce energy consumed, it is a key point to improve the economic efficiency of the process by removing as much water or moisture from the polymer slurry as possible in the dehydration process prior to subjecting the polymer slurry to the drying process to lower a moisture content.

As such, a slurry cake in which a portion of water or moisture has been removed from the polymer slurry in the dehydration process may be obtained as a polymer solid in the form of a powder having a low moisture content by going through the drying process through heating.

In particular, in a process of producing acrylonitrile-butadiene-styrene copolymer (ABS) or (meth)acrylate-butadiene-styrene copolymer (MBS), a bottleneck in the production process is caused due to the insufficient capacity of the drying process compared to the production capacity of the polymer slurry by polymerization.

Conventionally, in the case of a compression type dehydrator disclosed in Korean Patent Publication No. 10-1332037, there is described a dehydration method that pressurizes sludge by injecting air or liquid into a pressurizing tube made of a synthetic resin material, which is located at an upper inner side of a sludge chamber, and expands the pressurizing tube. However, in this case, the pressure transferred to the sludge by the expansion of the pressuring tube made of the synthetic resin material is generally only 30 barg, and consequently, there is a problem in that there is a limit to a dehydration capacity.

Accordingly, there is a need to develop a compression type dehydrator that may solve the above problems.

DISCLOSURE

Technical Problem

An object of the present invention is to provide a compression type dehydrator in which the dehydration performance of polymer slurry is improved by increasing a pressure for pressurizing the polymer slurry.

Technical Solution

According to an embodiment of the present invention, a compression type dehydrator includes: an upper plate that includes a pressurizing portion and a first guide adjacent to the pressurizing portion and spaced apart from the pressurizing portion, and performs a vertical movement by a hydraulic cylinder; a feed plate that includes a hollow portion and a first guide groove surrounding the hollow portion and guiding the vertical movement of the first guide, and is positioned on a lower portion of the upper plate; a slurry supply line connected to the feed plate; a lower plate positioned on a lower portion of the feed plate and having a plurality of holes formed therein; and a dehydration means including a filtration belt positioned in close contact with an upper portion of the lower plate.

Advantageous Effects

The compression type dehydrator according to the present invention may improve the dehydration performance of the polymer slurry by increasing the pressure for pressurizing the polymer slurry.

That is, the polymer slurry with the lowest moisture content may be introduced into the drying process, thereby saving energy consumed in the drying process.

BEST MODE

Terms and words used in the description and claims of the present invention are not to be construed as a general or dictionary meaning but are to be construed as meaning and concepts meeting the technical ideas of the present invention based on a principle that the inventor can appropriately define the concepts of terms in order to describe their own invention in best mode.

In the present invention, the term "slurry" may refer to a mixture of solid and liquid or a suspension in which fine solid particles are suspended in water, the term "polymer slurry" may refer to a mixture of a solvent used for polymerization and a solid such as a polymer produced by the polymerization reaction, or a suspension in which the solid is suspended in the solvent.

In the present invention, the term "slurry cake" may refer to a solid after the slurry is dehydrated and filtered.

Hereinafter, the present invention will be described in more detail with reference to the following drawings in order to help the understanding of the present invention.

Figure 1:
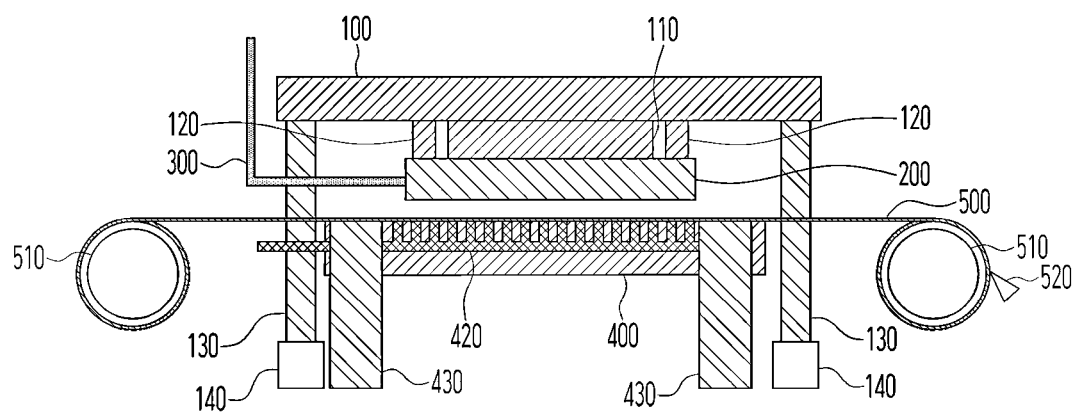
FIG. 1 is a front view illustrating a compression type dehydrator in which a dehydration means is not stacked according to an embodiment of the present invention.

First, a compression type dehydrator according to the present invention will be described with reference to FIGS. 1 to 3.

According to the present invention, a compression type dehydrator is provided. The compression type dehydrator may include an upper plate 100 that includes a pressurizing portion 110 and a first guide 120 adjacent to the pressurizing portion 110 and spaced apart from the pressurizing portion 110, and performs a vertical movement by a hydraulic cylinder (not illustrated); a feed plate 200 that includes a hollow portion 210 and a first guide groove 220 surrounding the hollow portion 210 and guiding the vertical movement of the first guide 120, and is positioned on a lower portion of the upper plate 100; a slurry supply line 300 connected to the feed plate 200; a lower plate 400 positioned on a lower portion of the feed plate 200 and having a plurality of holes 410 formed therein; and a dehydration means including a filtration belt 500 positioned in close contact with an upper portion of the lower plate 400.

In general, a process of producing polymers largely includes polymerization, coagulation, dehydration, and drying processes, and the polymer slurry produced through the polymerization and coagulation processes contains a large amount of moisture.

The drying process is performed in a manner through heating using a hot air dryer, a fluidized bed dryer, an airflow dryer, an infrared dryer, a dielectric heating dryer, or the like, and in this case, in order to reduce energy consumed, it is a key point to improve the economic efficiency of the process by removing as much moisture from the polymer slurry as possible in the dehydration process prior to subjecting the polymer slurry to the drying process to lower a moisture content.

As such, a slurry cake in which the moisture has been removed from the polymer slurry in the dehydration process may be obtained as a polymer solid in the form of a powder having a low moisture content by going through the drying process through heating.

Accordingly, an object of the present invention is to provide a compression type dehydrator capable of reducing energy consumed in the drying process by improving the dehydration performance of the polymer slurry by increasing the pressure for pressurizing the polymer slurry compared to the prior art, and introducing the polymer slurry with the lowest water content.

According to an embodiment of the present invention, the compression type dehydrator according to the present invention may include an upper plate 100 that includes a pressurizing portion 110 and a first guide 120 spaced apart from the pressurizing portion 110 to be adjacent to the pressurizing portion 110, and performs a vertical movement by a hydraulic cylinder (not illustrated).

The pressurizing portion 110 may be positioned on a bottom surface of the upper plate 100 to pressurize a slurry disposed on the lower plate 400 to be described later. As a specific example, the pressurizing portion 110 may be positioned at the central portion of the bottom surface of the upper plate 100, but is not limited thereto.

When the pressurizing portion 110 is positioned at the central portion of the upper plate 100, a pressure transferred to the slurry by a downward movement of the upper plate 100 may be uniform.

The first guide 120 is positioned on the bottom surface of the upper plate 100, and at the same time, is adjacent to the pressurizing portion 110 and spaced apart from the pressurizing portion 110, and a portion of the first guide 120 may be inserted into and led from the first guide groove 220 included in the feed plate 200 to be described later according to the vertical movement of the upper plate 100.

For example, when the upper plate 100 downwardly moves, the first guide 120 may be inserted into the first guide groove 220. On the other hand, when the upper plate 100 upwardly moves, the first guide 120 inserted into the first guide groove 220 may be led from the first guide groove 220.

According to an embodiment of the present invention, the compression type dehydrator according to the present invention may include a feed plate 200 that includes a hollow portion 210 and a first guide groove 220 surrounding the hollow portion 210 and guiding the vertical movement of the first guide 120, and is positioned on a lower portion of the upper plate 100.

Figure 2:
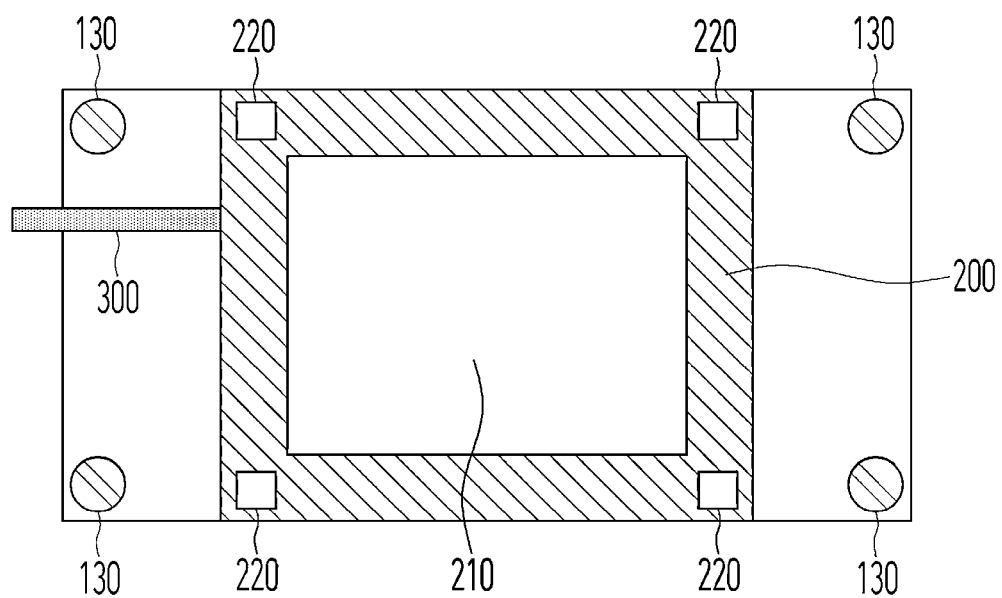
FIG. 2 is a cross-sectional view of an upper plate according to an embodiment of the present invention.

As illustrated in FIG. 2, the feed plate 200 may include a hollow portion 210. According to the downward movement of the upper plate 100, when the feed plate 200 comes into contact with the upper surface of the lower plate 400 to be described later, the hollow portion 210 of the feed plate 200 and an upper portion of the lower plate 400 may form a storing portion (not illustrated) in which the slurry is disposed.

As described above, the first guide groove 220 may guide the vertical movement such that a portion of the first guide 120 is inserted and led.

According to an embodiment of the present invention, the compression type dehydrator according to the present invention may include a slurry supply line 300 connected to the feed plate 200.

The slurry supply line 300 may serve to supply the slurry from a slurry tank (not illustrated) or a polymer coagulation process portion (not illustrated) separately provided outside the feed plate 200 to the above-described storing portion.

According to an embodiment of the present invention, the compression type dehydrator according to the present invention may include a lower plate 400 positioned on a lower portion of the feed plate 200 and having a plurality of holes 410 formed therein.

Figure 3:
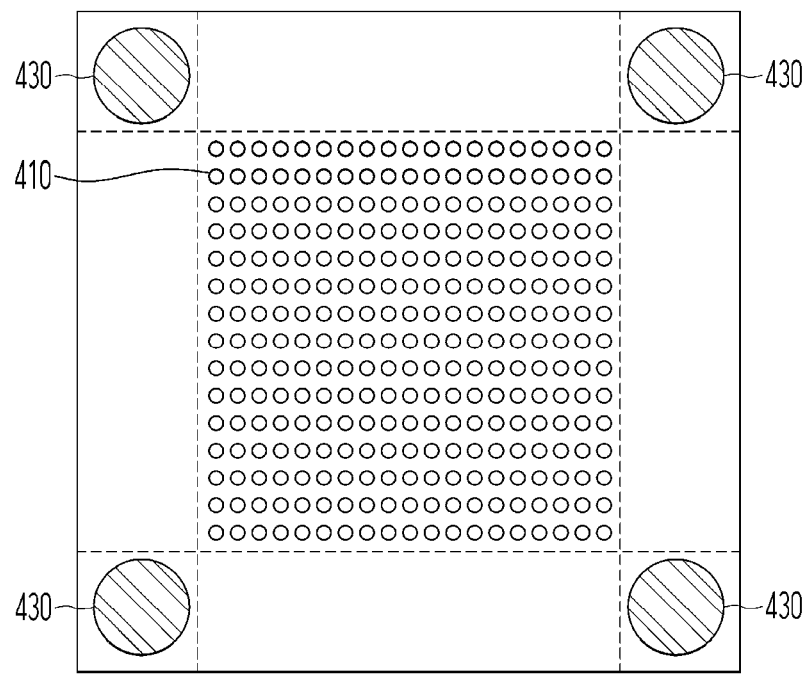
FIG. 3 is a cross-sectional view of a lower plate according to an embodiment of the present invention.

As illustrated in FIG. 3, the lower plate 400 includes a plurality of holes 410, so that moisture filtered from the slurry may be introduced into the holes 410. As a specific example, while the slurry disposed in the storing portion (not illustrated) is compressed by the downward movement of the upper plate 100, filtered moisture may be introduced into the holes 410.

In this case, in order to filter the moisture from the slurry, the compression type dehydrator according to the present invention may include a filtration belt 500 positioned in close contact with the upper portion of the lower plate. The filtration belt 500 may include pores having a size through which the moisture may be filtered from the slurry and the filtered moisture may be introduced into the plurality of holes 410 included in the lower plate 400.

In this way, the moisture is filtered from the slurry disposed in the storing portion (not illustrated) through the filtration belt 500, so that a dehydrated slurry cake 600 remains in the storing portion (not illustrated).

According to an embodiment of the present invention, the compression type dehydrator according to the present invention may further include a drain pipe 420 connected to the plurality of holes 410 and discharging the moisture introduced into the holes to the outside, in the lower plate 400.

The drain pipe 420 may be directly connected to each of all the holes 410 included in the lower plate 400, but is not limited thereto.

According to an embodiment of the present invention, the compression type dehydrator according to the present invention may further include a vacuum device (not illustrated) connected to the drain pipe 420.

The vacuum device (not illustrated) may serve to suck the moisture discharged to the outside of the lower plate 400 through the drain pipe 420. Accordingly, in the process in which the slurry disposed in the storing portion is compressed by the pressurizing portion 110, a suction force by the vacuum device (not illustrated) may also act on the slurry to further improve the dehydration performance.

When the compression type dehydrator according to the present invention further includes the vacuum device (not illustrated), and the drain pipe 420 is directly connected to each of all the holes 410 included in the lower plate 400, the dehydration performance of the slurry may be maximally improved, and accordingly, the slurry cake 600 having the lowest moisture content may be formed.

According to an embodiment of the present invention, the compression type dehydrator according to the present invention may further include a pair of rollers 510 provided in a longitudinal direction of the filtration belt 500.

As the filtration belt 500 is wound by at least one of the pair of rollers 510, the filtration belt 500 may move in the longitudinal direction, and the slurry cake 600 may be transported according to the movement of the filtration belt 500.

In this way, the slurry cake 600 transported according to the movement of the filtration belt 500 may be transported to a separate storage tank (not illustrated) or a drying process portion (not illustrated).

In this case, a separation barrier 520 may be provided on a roller positioned in the direction in which the slurry cake 600 is transported along the longitudinal direction among the pair of rollers 510, and may serve to prevent the slurry cake 600 from being separated from a position to be transported.

According to an embodiment of the present invention, the compression type dehydrator according to the present invention may further include a second guide 130 supporting the upper plate 100; an upper plate support 140 having a second guide groove (not illustrated) for guiding a vertical movement of the second guide 130; and a lower plate support 430 supporting the lower plate 400.

The second guide 130 supporting the upper plate 100 may perform a vertical movement by a hydraulic cylinder (not illustrated). As a specific example, a portion of the second guide 130 may perform the vertical movement while being inserted into and led from a second guide groove (not illustrated) provided in the upper plate support 140.

That is, the vertical movement of the upper plate 100 may be performed by the vertical movement of the second guide 130.

According to an embodiment of the present invention, in the compression type dehydrator according to the present invention, two or more dehydration means may be stacked. In this way, when the two or more dehydration means are stacked, dehydration of a large amount of polymer slurry may be easily performed in the process of producing a polymer solid from a large amount of polymer slurry.

When the two or more dehydration means are stacked, the second guide 130 may support the two or more upper plates 100, and the lower plate support 430 may support the two or more lower plates 400.

Figure 4:
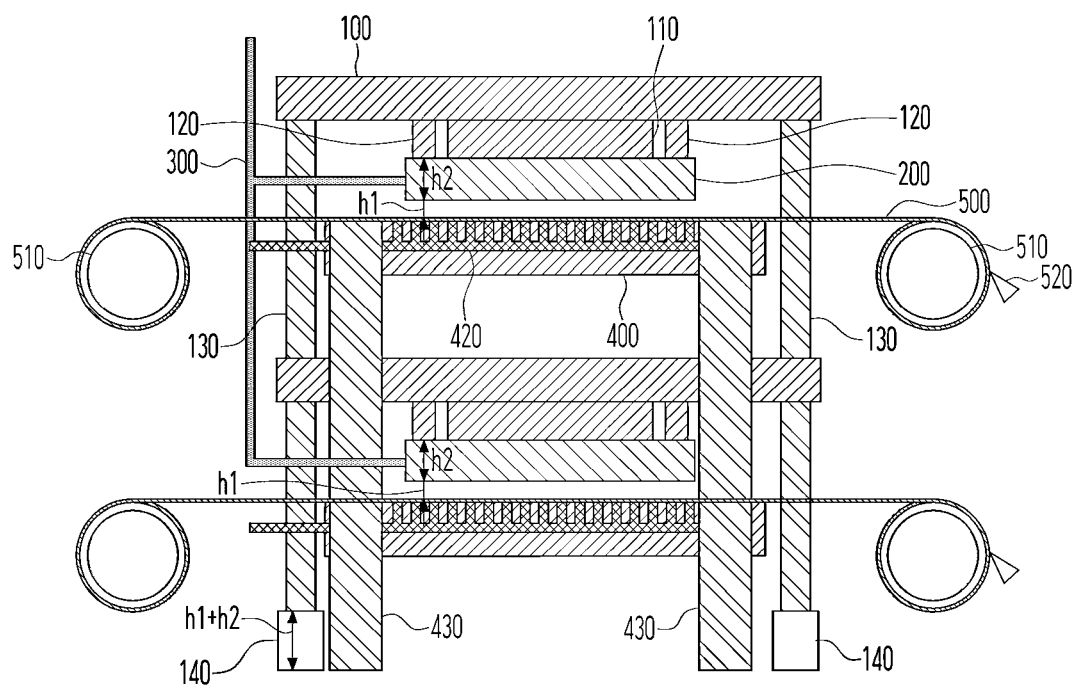
FIG. 4 is a view illustrating an aspect before an operation of the compression type dehydrator is started, according to an embodiment of the present invention.

As a specific example, as illustrated in FIG. 4, when the compression type dehydrator includes two or more upper plates 100, the second guide 130 may be provided in a coupled form by penetrating through all of the remaining upper plates 100 except for one upper plate 100 positioned at the uppermost portion of the two or more upper plates 100, and may support all of the two or more upper plates 100.

In addition, when the compression type dehydrator includes two or more lower plates 400, the lower plate support 430 may be provided in a coupled form by penetrating through all of the remaining lower plates 400 except for one lower plate 400 positioned at the uppermost portion of the two or more lower plates 400, and may support all of the two or more lower plates 400.

In this case, in a state where the lower plate support 430 is fixed without vertical movement, vertical movements of the two or more upper plates 100 may be simultaneously performed by a vertical movement of the second guide 130.

Hereinafter, an operation method of the compression type dehydrator will be described in detail with reference to FIGS. 4 to 9.

According to an embodiment of the present invention, FIG. 4 is a view illustrating an aspect before an operation of the compression type dehydrator is started.

As a specific example, as illustrated in FIG. 4, referring to an aspect before the operation of the compression type dehydrator is started, an aspect before the first guide 120 and the second guide 130 are inserted into the first guide groove 220 and the second guide groove (not illustrated), respectively, may be illustrated.

As a more specific example, the operation of the compression type dehydrator may be performed by a first vertical movement and a second vertical movement of the second guide 130.

First, when the second guide 130 performs a first downward movement, the first guide 120 may not perform the vertical movement, and the bottom surface of the feed plate 200 and the upper surface of the lower plate 400 may be in contact with each other.

Furthermore, when the second guide 130 performs a second downward movement, the first guide 120 may pressurize the slurry disposed on the lower plate 400 from the pressurizing portion 110 of the upper plate 100 while performing the downward movement in which the first guide 120 is inserted into the first guide groove 220.

Next, a process of pressurizing the slurry according to the vertical movement of the second guide 130 and a process of discharging the slurry cake generated due to the pressurization of the slurry will be described in detail with reference to FIGS. 5 to 8.

Figure 5:
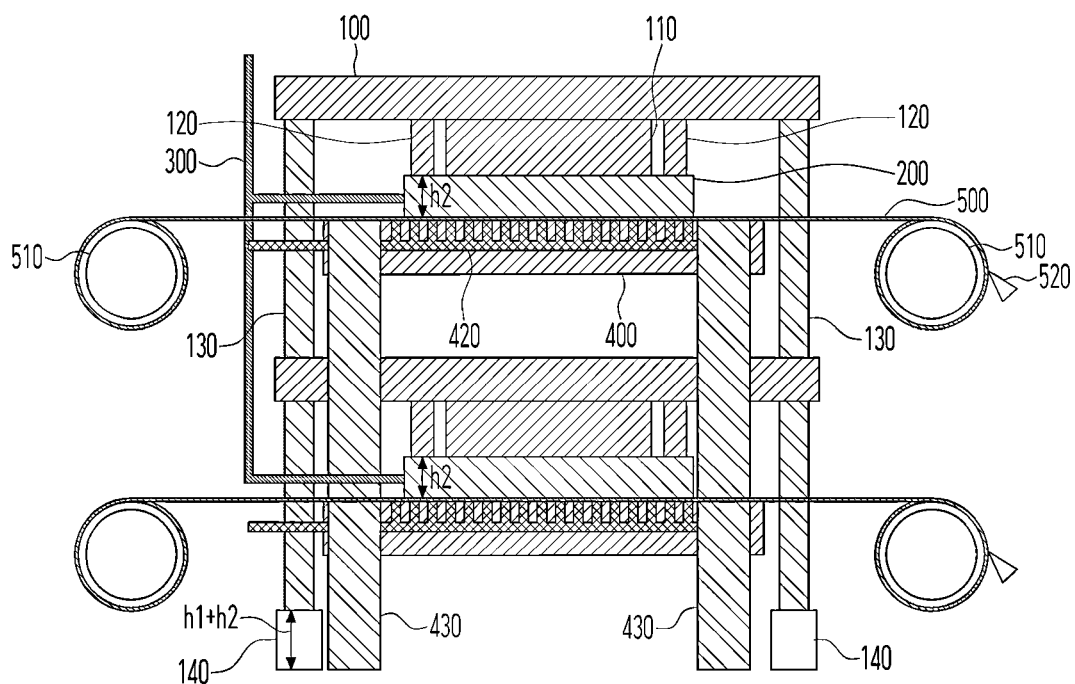
FIG. 5 is a view illustrating an aspect in which a feed plate and an upper surface of a lower plate come into contact with each other by a first downward movement of a second guide, according to an embodiment of the present invention.

According to an embodiment of the present invention, FIG. 5 is a view illustrating an aspect in which a feed plate 200 and an upper surface of a lower plate 400 come into contact with each other by a first downward movement of a second guide 130.

As a specific example, as illustrated in FIG. 5, in order to bring the feed plate 200 and the upper surface of the lower plate 400 into contact with each other, the second guide 130 may perform a first downward movement in a height direction of the second guide groove (not illustrated). Referring to FIGS. 4 and 5 more specifically, the second guide 130 may perform the first downward movement by a height of 'h1', which is a separation distance between the feed plate 200 and the lower plate 400. That is, the bottom surface of the feed plate 200 and the upper surface of the lower plate 400 may come into contact with each other by the first downward movement of the second guide 130.

In this way, in the state in which the bottom surface of the feed plate 200 and the upper surface of the lower plate 400 come into contact with each other, the hollow portion 210 of the feed plate 200 and the upper portion of the lower plate 400 may form the storing portion (not illustrated) in which the slurry is disposed, as described above. After the storing portion (not illustrated) is formed, the slurry may be supplied to and disposed in the storing portion through the slurry supply line 300.

Figure 6:
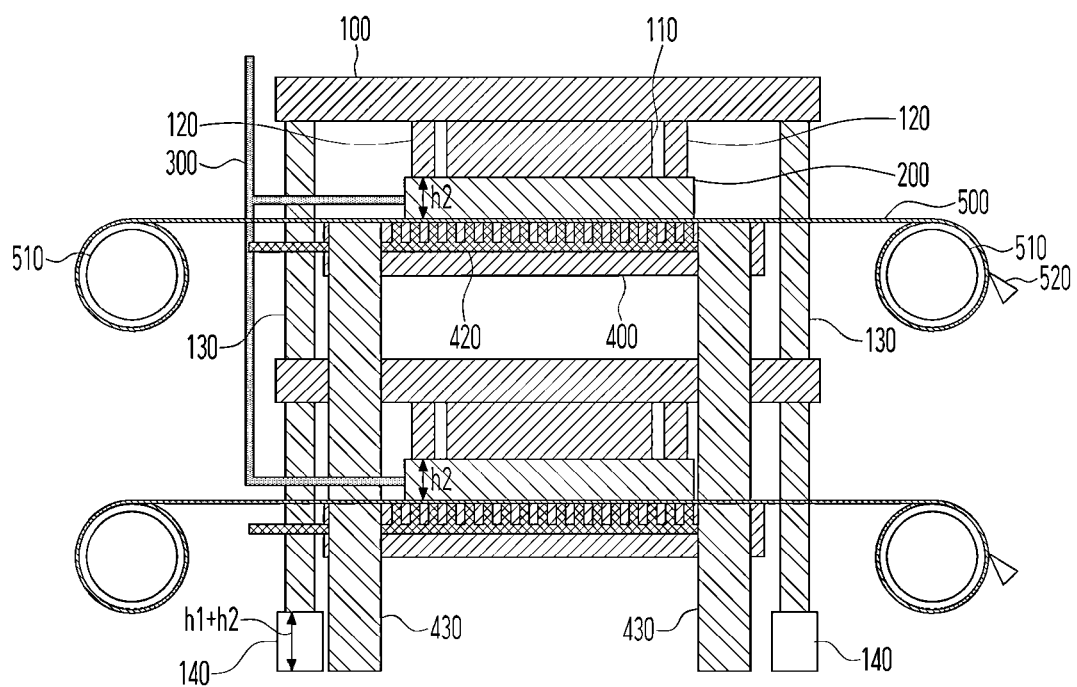
FIG. 6 is a view illustrating an aspect of pressurizing a slurry from a pressurizing portion through a second downward movement of the second guide, according to an embodiment of the present invention.

According to an embodiment of the present invention, FIG. 6 is a view illustrating an aspect of pressurizing a slurry from a pressurizing portion 110 through a second downward movement of the second guide 130.

As a specific example, as illustrated in FIG. 6, in order to pressurize the slurry disposed in the storing portion (not illustrated) from the pressurizing portion 110 of the upper plate 100, the second guide 130 may perform a second downward movement in the height direction of the second guide groove (not illustrated). Referring to FIGS. 5 and 6 more specifically, the second guide 130 may perform the second downward movement within a height range of 'h2', which is a height of the first guide groove 220, and in this case, the second guide 130 may perform the second downward movement within the height range of 'h2', excluding a height of the slurry cake generated by the pressurization of the slurry disposed in the storing portion (not illustrated). That is, the slurry may be pressurized by the second downward movement of the second guide 130.

As a more specific example, the first guide 120 may perform the second downward movement within the height range of 'h2', which is the height of the first guide groove 220, by the second downward movement of the second guide 130, and in this case, the first guide 120 may perform the second downward movement within the height range of 'h2', excluding a height of the slurry cake generated by the pressurization of the slurry disposed in the storing portion (not illustrated). Accordingly, the slurry disposed in the storing portion (not illustrated) may be pressurized by the pressurizing portion 110 of the upper plate 100.

In this way, when the slurry is pressurized, a dehydration process of the slurry in which the moisture contained in the slurry is filtered through the filtration belt 500 may be performed. In this case, the moisture filtered from the slurry may pass through the filtration belt 500 and be introduced into the plurality of holes 410 included in the lower plate 400. Meanwhile, the moisture introduced into the holes 410 may be discharged to the outside of the lower plate 400 through the drain pipe 420.

In addition, as the moisture is filtered from the slurry disposed in the storing portion (not illustrated) through the filtration belt 500, the dehydrated slurry cake 600 remains in the storing portion (not illustrated).

Figure 7:
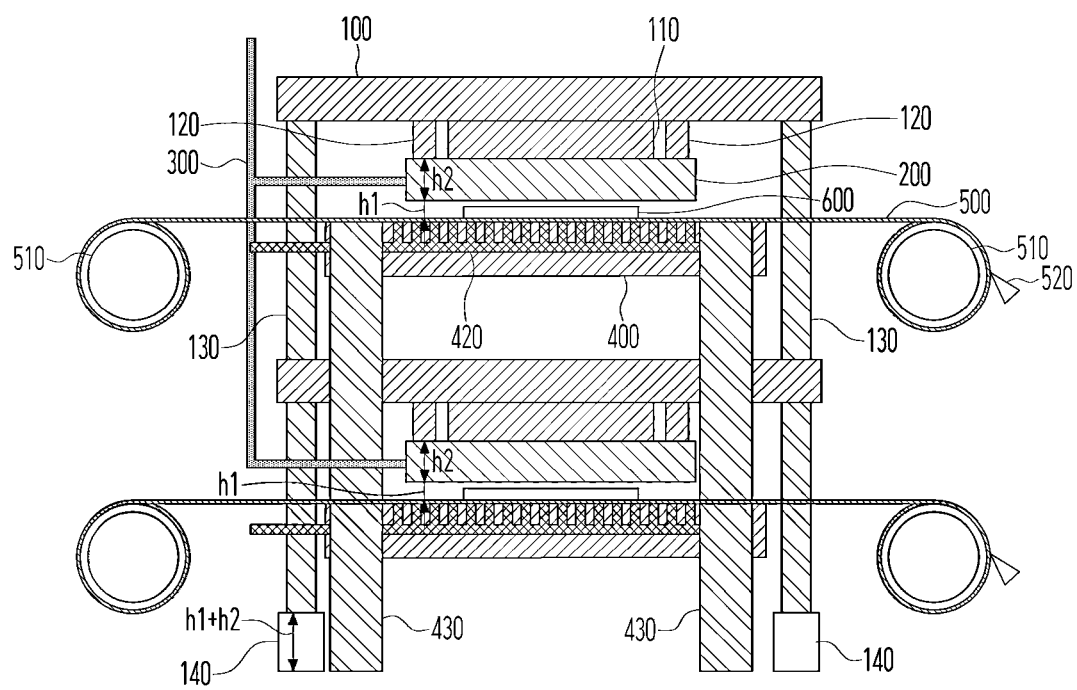
FIG. 7 is a view illustrating an aspect of raising the upper plate and the feed plate through a first upward movement and a second upward movement of the second guide according to an embodiment of the present invention.

According to an embodiment of the present invention, FIG. 7 is a view illustrating an aspect of raising the upper plate 100 and the feed plate 200 through a first upward movement and a second upward movement of the second guide 130.

As a specific example, as illustrated in FIG. 7, in order to discharge the dehydrated slurry from the compression type dehydrator, the upper plate 100 and the feed plate 200 may be raised through the first upward movement and the second upward movement of the second guide 130. That is, the second guide 130 may perform the upward movement as much as a height of the first downward movement and the second downward movement described above in a height direction of the second guide groove (not illustrated) through the first upward movement and the second upward movement of the second guide 130.

As a more specific example, the upward movement of the second guide 130 described above may be performed in the order of the second upward movement and the first upward movement. First, when the second guide 130 may perform the second upward movement, the second guide 130 may perform the upward movement as much as the height of the second downward movement described above in the height direction of the second guide groove (not illustrated) to raise the upper plate 100 that pressurizes the slurry again. Next, when the second guide 130 may perform the first upward movement, the second guide 130 may perform the upward movement as much as the height of the first downward movement described above, that is, the height of 'h1' in the height direction of the second guide groove (not illustrated) to raise the feed plate 200 that is in contact with the upper surface of the lower plate 400.

Figure 8:
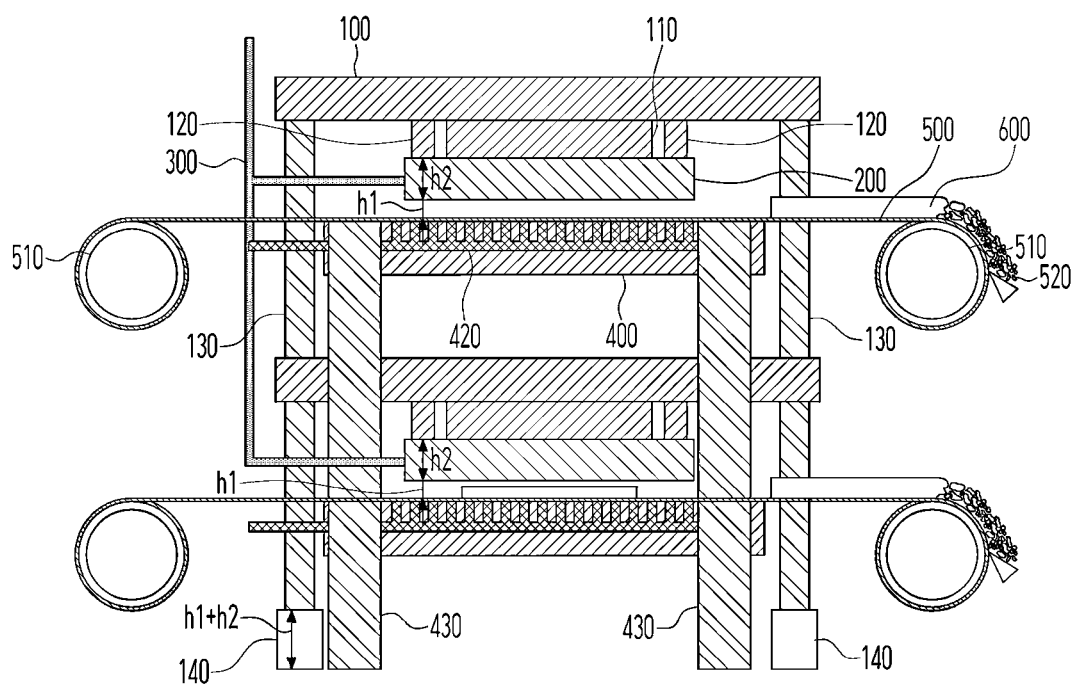
FIG. 8 is a view illustrating an aspect in which a slurry cake is transported according to a movement of a filtration belt by a roller according to an embodiment of the present invention.

According to an embodiment of the present invention, FIG. 8 is a view illustrating an aspect in which a slurry cake 600 is transported according to a movement of a filtration belt 500 by a roller 510.

As a specific example, as illustrated in FIG. 8, in the state in which the upper plate 100 is raised due to the first upward movement and the second upward movement of the second guide 130, as the filtration belt 500 is wound by at least one of the pair of rollers 510, the filtration belt 500 may move in the longitudinal direction, and the slurry cake 600 may be transported according to the movement of the filtration belt 500. In this way, the slurry cake 600 transported according to the movement of the filtration belt 500 may be transported to a separate storage tank (not illustrated) or a drying process portion (not illustrated).

According to an embodiment of the present invention, a length w1 of a width of a distal end of the first guide 120 may be longer than a length w2 of a width of the first guide groove 220 so that the first guide 120 is not separated from the first guide groove 220 as the first guide 210 performs the upward movement.

Figure 9:
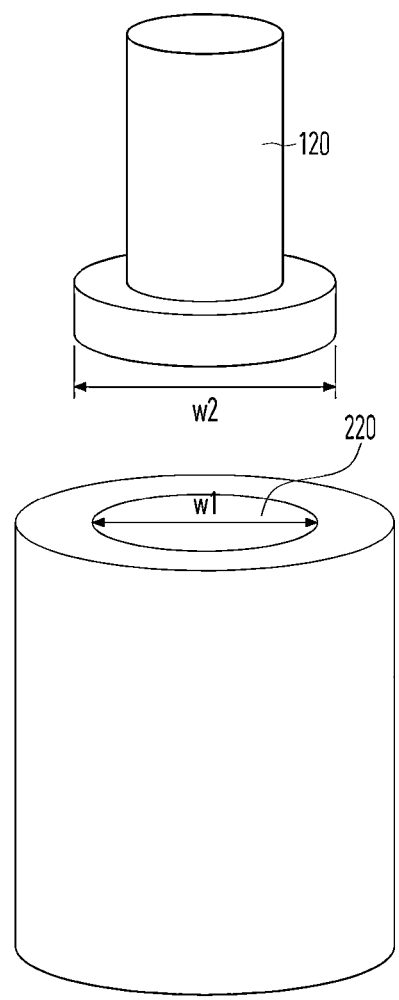
FIG. 9 is a perspective view illustrating a first guide and a first guide groove according to an embodiment of the present invention.

As a specific example, as illustrated in FIG. 9, the length w1 of the width of the distal end of the first guide 120 may be longer than the length w2 of the width of the first guide groove 220, and accordingly, it is possible to prevent the first guide 120 from being separated from the first guide groove 220 even though the first guide 120 performs the upward movement by the first upward movement or the second upward movement of the second guide 130.

As described above, although the operation of the compression type dehydrator in which two or more dehydration means are stacked has been described with reference to FIGS. 4 to 8, a compression type dehydrator in which the dehydration means of FIG. 3 is not stacked may also be operated in the same manner as the operation method of the compression type dehydrator described with reference to FIGS. 4 to 8.

Figure 10:
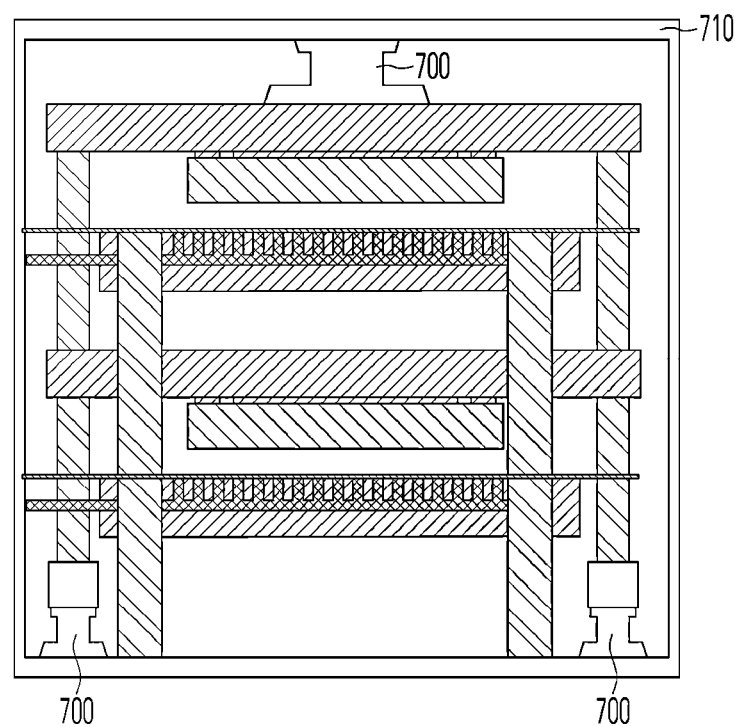
FIG. 10 is a front view illustrating a position of a hydraulic cylinder of a compression type dehydrator according to an embodiment of the present invention.

According to an embodiment of the present invention illustrated in FIG. 10, the vertical movement of the upper plate 100, that is, the vertical movement of the second guide 130, may be performed by a hydraulic cylinder 700 installed on the upper portion of the upper plate 100, a hydraulic cylinder 700 installed on the lower portion of the second guide 130, or both the hydraulic cylinders, but is not limited thereto. In addition, as illustrated in FIG. 10, the compression type dehydrator according to the present invention may further include a frame 710 for fixing the hydraulic cylinder 700 installed on the upper portion of the upper plate 100 without interfering with the operation of all components included in the compression type dehydrator.

Figure 11:
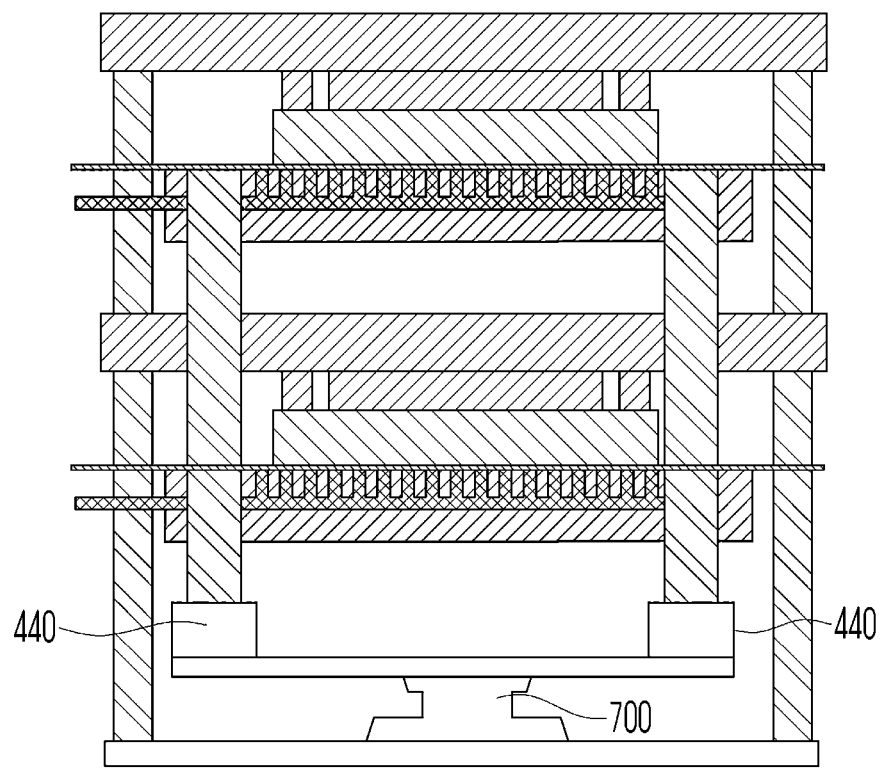
FIG. 11 is a front view illustrating a position of a hydraulic cylinder of a compression type dehydrator according to another embodiment of the present invention.

According to another embodiment of the present invention illustrated in FIG. 11, in the compression type dehydrator according to the present invention, in a state in which the upper plate 100, that is, the second guide 130, is fixed without performing the vertical movement, a portion of the first guide 120 may be inserted into and led from the first guide groove 220 included in the feed plate 200 by the vertical movement of the lower plate 400, that is, the lower plate support 430. In this case, the vertical movement of the lower plate support 430 may be performed by the hydraulic cylinder 700 installed on the lower portion of the lower plate support 430, but is not limited thereto. In addition, in this case, the upper plate support 140 for guiding the vertical movement of the second guide may not be included.

As a specific example, as illustrated in FIG. 11, when the compression type dehydrator performs the vertical movement of the lower plate 400, that is, the lower plate support 430, the compression type dehydrator may further include a first support 440 provided with a third guide groove (not illustrated) for guiding the vertical movement of the lower plate support 430, and the vertical movement of the lower plate 400 may be performed while a portion of the lower plate support 430 is inserted into and led from a third guide groove (not illustrated) included in the first support 440.

FIGS. 4 to 8 illustrate only the views according to the embodiment in which the vertical movements of the two or more upper plates 100 are simultaneously performed by the vertical movement of the second guide 130 while the lower plate support 430 is fixed without performing the vertical movement, but as illustrated in FIG. 11, another embodiment in which the vertical movements of the two or more lower plates 400 are simultaneously performed by the vertical movement of the lower plate support 430 while the second guide 130 is fixed without performing the vertical movement may also be included in the present invention.

As a specific example, an operation of the compression type dehydrator according to an aspect illustrated in FIG. 11 may be performed by a first vertical movement and a second vertical movement of the lower plate support 430.

First, when the lower plate support 430 performs a first upward movement, the first guide 120 may not perform the vertical movement, and the bottom surface of the feed plate 200 and the upper surface of the lower plate 400 may be in contact with each other.

Furthermore, when the lower plate support 430 performs a second upward movement, the first guide 120 may pressurize the slurry disposed on the lower plate 400 from the pressurizing portion 110 of the upper plate 100 while being inserted into the first guide groove 220.

In addition, the hydraulic cylinder illustrated in FIGS. 10 and 11 may perform an operation while hydraulic pressure is applied thereto when the second guide 130 or the lower plate support 430 performs the upward movement, and the hydraulic pressure is released therefrom when the second guide 130 or the lower plate support 430 performs the downward movement.

In addition, although detailed reference numerals for all components of the compression type dehydrator of FIGS. 10 and 11 are not denoted, they may be the same as the reference numerals of all components of the compression type dehydrator included in FIGS. 1 to 9.

According to an embodiment of the present invention, the upper plate 100, the feed plate 200, and the lower plate 400 may be made of one or more selected from the group consisting of titanium, tungsten, bronze, carbon steel for mechanical structure, stainless steel, and nickel-chromium steel. The upper plate 100, the feed plate 200, and the lower plate 400 made of the above-described materials may not be deformed or damaged by pressure, and are not limited only to the types of the above-described materials.

According to the embodiment of the present invention, the slurry may be a polymer slurry produced by a polymerization reaction. As described above, the compression type dehydrator according to the present invention has the effect of reducing the energy consumed in the drying process by maximally lowering the moisture content of the polymer slurry in the dehydration process prior to the drying process in the process for producing the polymer solid.

The polymer slurry may be an acrylonitrile-butadiene-styrene polymer slurry (ABS) or a methacrylate-butadiene-styrene polymer slurry (MBS), and in this case, the dehydration performance of the ABS or MBS polymer slurry by the compression type dehydrator according to the present invention may be excellent.

Hereinabove, although the compression type dehydrator according to the present invention has been described and illustrated in the drawings, the description and the illustration in the drawings describe and illustrate only the essential components for understanding the present invention, and in addition to the processes and devices illustrated in the description and drawings, processes and devices not separately described and not illustrated may be appropriately applied and used to implement the compression type dehydrator according to the present invention.

The invention claimed is:

1. A compression type dehydrator comprising:
   two or more upper plates that each comprises a pressurizing portion and a first guide adjacent to the pressurizing portion and spaced apart from the pressurizing portion, wherein each of the upper plates performs a vertical movement by a hydraulic cylinder;
   a feed plate that comprises a hollow portion and a first guide groove surrounding the hollow portion and guiding the vertical movement of the first guide of at least one of the upper plates, wherein the feed plate is positioned on a lower portion of at least one of the upper plates;
   a slurry supply line connected to the feed plate;

two or more lower plates having a plurality of holes formed therein, wherein at least one of the lower plates is positioned below a lower portion of the feed plate and;

a second guide supporting the upper plates;

an upper plate support having a second guide groove for guiding a vertical movement of the second guide;

a lower plate support supporting the lower plates; and two or more dehydration means that are stacked, each of the dehydration means comprising a filtration belt positioned in close contact with an upper portion of at least one of the lower plates.

2. The compression type dehydrator of claim 1, wherein a slurry is disposed in the upper portion of the lower plates and the hollow portion of the feed plate, through the slurry supply line, and filtered moisture is introduced into the holes of the lower plates while the disposed slurry is compressed by a downward movement of the upper plates.

3. The compression type dehydrator of claim 2, further comprising a drain pipe connected to the plurality of holes and discharging the moisture introduced into the holes to the outside of the lower plates.

4. The compression type dehydrator of claim 1, further comprising a pair of rollers provided in a longitudinal direction of the filtration belt.

5. The compression type dehydrator of claim 4, wherein the filtration belt moves in the longitudinal direction by at least one of the pair of rollers, and a slurry cake is transported according to the movement of the filtration belt.

6. The compression type dehydrator of claim 1, wherein vertical movements of the upper plates are simultaneously performed by a vertical movement of the second guide.

7. The compression type dehydrator of claim 1, wherein the upper plates, the feed plate, and the lower plates are made of one or more selected from the group consisting of titanium, tungsten, bronze, carbon steel for mechanical structure, stainless steel, and nickel-chromium steel.

8. The compression type dehydrator of claim 1, wherein the slurry is a polymer slurry produced by a polymerization reaction.

9. A compression type dehydrator comprising:

two or more upper plates that each comprises a pressurizing portion and a first guide adjacent to the pressurizing portion and spaced apart from the pressurizing portion, wherein each of the upper plates performs a vertical movement by a hydraulic cylinder;

a feed plate that comprises a hollow portion and a first guide groove surrounding the hollow portion and guiding the vertical movement of the first guide of at least one of the upper plates, wherein the feed plate is positioned on a lower portion of at least one of the upper plates;

a slurry supply line connected to the feed plate;

two or more lower plates having a plurality of holes formed therein, wherein at least one of the lower plates is positioned below a lower portion of the feed plate and;

a second guide supporting the upper plates;

an upper plate support having a second guide groove for guiding a vertical movement of the second guide;

a lower plate support supporting the lower plates; and two or more dehydration means that are stacked, each of the dehydration means comprising a filtration belt positioned in close contact with an upper portion of at least one of the lower plates, wherein a polymer slurry produced by a polymerization reaction is disposed in the upper portion of the lower plates and the hollow portion of the feed plate, through the slurry supply line, and filtered moisture is introduced into the holes of the lower plates while the disposed slurry is compressed by a downward movement of the upper plates.

10. The compression type dehydrator of claim 9, further comprising a drain pipe connected to the plurality of holes and discharging the moisture introduced into the holes to the outside of the lower plates.

11. The compression type dehydrator of claim 9, further comprising a pair of rollers provided in a longitudinal direction of the filtration belt.

12. The compression type dehydrator of claim 11, wherein the filtration belt moves in the longitudinal direction by at least one of the pair of rollers, and a slurry cake is transported according to the movement of the filtration belt.

13. The compression type dehydrator of claim 9, wherein vertical movements of the upper plates are simultaneously performed by a vertical movement of the second guide.

14. The compression type dehydrator of claim 9, wherein the upper plates, the feed plate, and the lower plates are made of one or more selected from the group consisting of titanium, tungsten, bronze, carbon steel for mechanical structure, stainless steel, and nickel-chromium steel.

15. A compression type dehydrator comprising:

two or more upper plates that each comprises a pressurizing portion and a first guide adjacent to the pressurizing portion and spaced apart from the pressurizing portion, wherein each of the upper plates performs a vertical movement by a hydraulic cylinder;

a feed plate that comprises a hollow portion and a first guide groove surrounding the hollow portion and guiding the vertical movement of the first guide of at least one of the upper plates, wherein the feed plate is positioned on a lower portion of at least one of the upper plates;

a slurry supply line connected to the feed plate;

two or more lower plates having a plurality of holes formed therein, wherein at least one of the lower plates is positioned below a lower portion of the feed plate and;

a second guide supporting the upper plates, wherein vertical movements of the upper plates are simultaneously performed by a vertical movement of the second guide;

an upper plate support having a second guide groove for guiding a vertical movement of the second guide;

a lower plate support supporting the lower plates; and two or more dehydration means that are stacked, each of the dehydration means comprising a filtration belt positioned in close contact with an upper portion of at least one of the lower plates, wherein a slurry is disposed in the upper portion of the lower plates and the hollow portion of the feed plate, through the slurry supply line, and filtered moisture is introduced into the holes of the lower plates while the disposed slurry is compressed by a downward movement of the upper plates.

16. The compression type dehydrator of claim 15, further comprising a drain pipe connected to the plurality of holes and discharging the moisture introduced into the holes to the outside of the lower plates.

17. The compression type dehydrator of claim 15, further comprising a pair of rollers provided in a longitudinal direction of the filtration belt.

18. The compression type dehydrator of claim 17, wherein the filtration belt moves in the longitudinal direction by at least one of the pair of rollers, and a slurry cake is transported according to the movement of the filtration belt.

19. The compression type dehydrator of claim 15, wherein the upper plates, the feed plate, and the lower plates are made of one or more selected from the group consisting of titanium, tungsten, bronze, carbon steel for mechanical structure, stainless steel, and nickel-chromium steel.

20. The compression type dehydrator of claim 15, wherein the slurry is a polymer slurry produced by a polymerization reaction.

\* \* \* \* \*